United States Patent
Nakamura et al.

(10) Patent No.: US 7,295,271 B2
(45) Date of Patent: Nov. 13, 2007

(54) LIQUID CRYSTAL DISPLAY DEVICE AND MULTILAYER PHASE PLATE

(75) Inventors: Kozo Nakamura, Tenri (JP); Satoru Kishimoto, Tenri (JP)

(73) Assignee: Sharp Kabushiki Kaisha, Osaka (JP)

(*) Notice: Subject to any disclaimer, the term of this patent is extended or adjusted under 35 U.S.C. 154(b) by 4 days.

(21) Appl. No.: 10/824,832

(22) Filed: Apr. 14, 2004

(65) Prior Publication Data

US 2004/0207787 A1 Oct. 21, 2004

(30) Foreign Application Priority Data

Apr. 15, 2003 (JP) .............................. 2003-110153

(51) Int. Cl.
*G02F 1/1335* (2006.01)

(52) U.S. Cl. ....................... 349/119; 349/118

(58) Field of Classification Search ......... 349/117–119
See application file for complete search history.

(56) References Cited

U.S. PATENT DOCUMENTS 6,717,645 B2* 4/2004 Shimoshikiryou et al. .. 349/141
6,747,720 B2* 6/2004 Saiki et al. ................. 349/122

FOREIGN PATENT DOCUMENTS

JP 2001-188232 7/2001

OTHER PUBLICATIONS

Sergan, et al., "Achromatic Normally Black Twisted Nematic Device with Wide Viewing Angle Using Negative-in-plane Compensation Films", Jpn. J. Appl. Phys. vol. 37 (1998) pp. 889-894, Part 1, No. 3A, Mar. 1998.

Kumagawa, et al., "P2-9 Black and White STN-LCD Using Two Birefringent Films", Japan Display, 1989, pp. 312-315.

* cited by examiner

*Primary Examiner*—Dung T. Nguyen
(74) *Attorney, Agent, or Firm*—George W. Neuner; David G. Conlin; Edwards Angell Palmer & Dodge LLP

(57) ABSTRACT

A twisted nematic liquid crystal display device conducts a display operation in Normally Black mode. The liquid crystal display device includes a liquid crystal cell and two polarizers. The liquid crystal cell includes two substrates and a liquid crystal layer sandwiched between them. The two polarizers face each other with the liquid crystal cell interposed between them. The liquid crystal display device further includes: a first optical compensator provided between one of the two polarizers and the liquid crystal cell so as to compensate for the wavelength dependence of the angle of rotation of polarized light passing through the liquid crystal layer in a black display state; and a second optical compensator provided between the first optical compensator and that polarizer so as to compensate for the wavelength dependence of the ellipticity of the polarized light passing through the liquid crystal layer in the black display state.

14 Claims, 9 Drawing Sheets

LIQUID CRYSTAL DISPLAY DEVICE AND MULTILAYER PHASE PLATE

This non-provisional application claims priority under 35 USC § 119(a) on Patent Applications No. 2003-110153 filed in Japan on Apr. 15, 2003, the entire contents of which are hereby incorporated by reference.

BACKGROUND OF THE INVENTION

1. Field of the Invention

The present invention relates to a liquid crystal display (LCD) and more particularly relates to a twisted-nematic (TN) LCD for conducting a display operation in Normally Black mode. The present invention also relates to a multilayer phase plate for use in such an LCD.

2. Description of the Related Art

TN LCDs for conducting a display operation in Normally White mode are currently used extensively.

In a Normally White mode LCD, a portion of each pixel, which is not covered with its associated pixel electrode (e.g., a gap between a bus line and the pixel electrode), is always supplied with no voltage and always transmits light. This light causes no problem in white display state but becomes unintentionally leaking light in black display state, thus decreasing the contrast ratio of the display screen. In view of this potential problem, the front substrate normally includes an opaque layer to minimize such leakage of light.

In order to increase an allowable margin in bonding the two substrates of an LCD together, the area of such an opaque layer is normally set broader than the total area of the light leaking regions, thus decreasing the aperture ratio of pixels significantly. Accordingly, such an opaque layer constitutes a major obstacle to realizing an LCD with a sufficiently high aperture ratio.

Thus, to overcome such a problem, a normally black mode LCD for carrying out a black display operation with no voltage applied has been proposed. A normally black mode TN LCD performs a black display operation with liquid crystal molecules oriented in a twisted pattern in the thickness direction of a liquid crystal layer.

In the normally black mode TN LCD, however, the refractive index anisotropy of its liquid crystal layer usually has wavelength dependence (or wavelength dispersion characteristic), thus posing another problem of colored black display.

Hereinafter, it will be described how this problem happens on a liquid crystal layer, of which the retardation Δn·d is controlled so as to set its first minimum condition at 550 nm. If a linearly polarized light ray with a wavelength of 550 nm is allowed to be incident on this liquid crystal layer in the black display state (i.e., a state in which the liquid crystal molecules are oriented at a twist angle of 90 degrees), then the incoming linearly polarized light ray will have its polarization direction rotated by 90 degrees when leaving the liquid crystal layer. That is to say, the polarization direction of the outgoing linearly polarized light ray will be perpendicular to that of the incoming linearly polarized light ray. However, since the refractive index anisotropy of the liquid crystal layer has wavelength dispersion characteristic, an incoming linearly polarized light ray with any other wavelength will be an elliptically polarized light ray when leaving the liquid crystal layer. Furthermore, the major-axis direction of such an elliptically polarized light ray is not aligned with the polarization direction of the outgoing linearly polarized light ray with the wavelength of 550 nm. Such misalignment of the major-axis direction is unique to a liquid crystal layer with the twisted orientation and is never observed in any liquid crystal layer with non-twisted homogeneous orientation.

In this manner, in the normally black mode TN LCD, light that has been transmitted through its liquid crystal layer in the black display state includes not only the desired linearly polarized light ray but also other components as well. The linearly polarized light ray with the wavelength of 550 nm is blocked by the polarizer located closer to the viewer of the LCD but light rays with other wavelengths are transmitted through the same polarizer to a certain degree. As a result, the black display is somewhat colored and the contrast ratio decreases.

To overcome such a problem, a method of doing color compensation with a lot of phase films was proposed by Sergan and three others in "Achromatic Normally Black Twisted Nematic Device with Wide Viewing Angle Using Negative-In-Plane Compensation Films", Jpn. J. Appli. Phys., March, 1998, Vol. 37, pp. 889-894. A method of color compensation using a twisted phase plate, of which the slow axis is twisted in the thickness direction and which has wavelength dependence opposite to that of the liquid crystal layer, was also proposed for the same purpose in Japanese Laid-Open Publication No. 2001-188232, for example.

However, the former technique uses a lot of phase films, thus raising the manufacturing cost and the thickness of the display device. According to the latter technique on the other hand, the productivity of the twisted phase plate is too low to use it industrially, thus increasing the manufacturing cost, too.

SUMMARY OF THE INVENTION

In order to overcome the problems described above, preferred embodiments of the present invention provide a normally black mode twisted nematic liquid crystal display device, which can conduct a black display operation with the unwanted coloring minimized and with the contrast ratio increased significantly and which can be manufactured at a reduced cost, and also provide a multilayer phase plate, which can be used effectively in such a liquid crystal display device.

A twisted nematic liquid crystal display device according to a preferred embodiment of the present invention preferably conducts a display operation in Normally Black mode. The liquid crystal display device preferably includes a liquid crystal cell and two polarizers. The liquid crystal cell preferably includes two substrates and a liquid crystal layer sandwiched between the two substrates. The two polarizers preferably face each other with the liquid crystal cell interposed between them. The liquid crystal display device preferably further includes a first optical compensator and a second optical compensator. The first optical compensator is preferably provided between one of the two polarizers and the liquid crystal cell so as to compensate for the wavelength dependence of the angle of rotation of polarized light passing through the liquid crystal layer in a black display state. The second optical compensator is preferably provided between the first optical compensator and that polarizer so as to compensate for the wavelength dependence of the ellipticity of the polarized light passing through the liquid crystal layer in the black display state.

In one preferred embodiment of the present invention, if the polarized light passes through the liquid crystal layer in the black display state, the first optical compensator preferably has functions of hardly changing the polarization direction of a linearly polarized light ray having a particular wavelength but substantially aligning the elliptical major-axis direction of an elliptically polarized light ray, having a wavelength that is shorter or longer than the particular wavelength, with the polarization direction of the linearly polarized light ray.

In this particular preferred embodiment, if the polarized light passes through the liquid crystal layer in the black display state, the second optical compensator preferably has functions of passing the linearly polarized light ray having the particular wavelength as it is but changing the elliptically polarized light ray, having the wavelength that is shorter or longer than the particular wavelength, into a substantially linearly polarized light ray.

A twisted nematic liquid crystal display device according to another preferred embodiment of the present invention preferably conducts a display operation in Normally Black mode. The liquid crystal display device preferably includes a liquid crystal cell and two polarizers. The liquid crystal cell preferably includes two substrates and a liquid crystal layer sandwiched between the two substrates. The two polarizers preferably face each other with the liquid crystal cell interposed between themselves. The liquid crystal display device preferably further includes a first optical compensator and a second optical compensator. The first optical compensator is preferably provided between one of the two polarizers and the liquid crystal cell, and the second optical compensator is preferably provided between the first optical compensator and that polarizer. When polarized light passes through the liquid crystal layer in a black display state, the first optical compensator preferably has functions of hardly changing the polarization direction of a linearly polarized light ray having a particular wavelength but substantially aligning the elliptical major-axis direction of an elliptically polarized light ray, having a wavelength that is shorter or longer than the particular wavelength, with the polarization direction of the linearly polarized light ray, while the second optical compensator preferably has functions of passing the linearly polarized light ray having the particular wavelength as it is but changing the elliptically polarized light ray, having the wavelength that is shorter or longer than the particular wavelength, into a substantially linearly polarized light ray.

In one preferred embodiment of the present invention, the first optical compensator preferably exhibits a retardation, and preferably has a slow axis, within a plane that is defined parallel to the liquid crystal layer. The slow axis and the wavelength dispersion characteristic of in-plane retardations of the first optical compensator are preferably adjusted into predetermined ones according to the wavelength dependence of the angle of rotation of the polarized light passing through the liquid crystal layer in the black display state, thereby allowing the first optical compensator to perform the functions.

In another preferred embodiment, the second optical compensator preferably exhibits a retardation, and preferably has a slow axis, within a plane that is defined parallel to the liquid crystal layer. The slow axis and the wavelength dispersion characteristic of in-plane retardations of the second optical compensator are preferably adjusted into predetermined ones according to the wavelength dependence of the ellipticity of the polarized light passing through the liquid crystal layer in the black display state, thereby allowing the second optical compensator to perform the functions.

In still another preferred embodiment, the particular wavelength preferably falls within the range of 450 nm to 600 nm, more preferably falls within the range of 500 nm to 600 nm.

In yet another preferred embodiment, the liquid crystal layer preferably has a front retardation $\Delta n \cdot d$ of 390 nm to 550 nm in the black display state, more preferably 420 nm to 520 nm, particularly preferably 440 nm to 480 nm.

In yet another preferred embodiment, the first optical compensator preferably exhibits a retardation, and preferably has a slow axis, within a plane that is defined parallel to the liquid crystal layer. The first optical compensator preferably has an in-plane retardation $Re_1$ of 75 nm to 210 nm. The slow axis of the first optical compensator preferably defines an angle of 85 degrees to 95 degrees with respect to orientation directions of liquid crystal molecules in the black display state. The liquid crystal molecules are preferably included in the liquid crystal layer and located near one of the two substrates, which is closer to the first optical compensator. The first optical compensator more preferably has an in-plane retardation $Re_1$ of 105 nm to 175 nm. The slow axis of the first optical compensator more preferably defines an angle of 86 degrees to 94 degrees with respect to orientation directions of liquid crystal molecules in the black display state, particularly preferably defines an angle of approximately 90 degree.

In yet another preferred embodiment, the second optical compensator preferably exhibits a retardation, and preferably has a slow axis, within a plane that is defined parallel to the liquid crystal layer. The in-plane retardation $Re_2$ of the second optical compensator and the front retardation $\Delta n \cdot d$ of the liquid crystal layer preferably satisfy the inequality $0.44 \cdot (\Delta n \cdot d) + 50 \leq Re_2 \leq 0.44 \cdot (\Delta n \cdot d) + 80$. The slow axis of the second optical compensator preferably defines an angle of 42 degrees to 48 degrees with respect to orientation directions of liquid crystal molecules in the black display state. The liquid crystal molecules are preferably included in the liquid crystal layer and located near one of the two substrates, which is closer to the first optical compensator. The in-plane retardation $Re_2$ of the second optical compensator and the front retardation $\Delta n \cdot d$ of the liquid crystal layer more preferably satisfy the inequality $0.44 \cdot (\Delta n \cdot d) + 55 \leq Re_2 \leq 0.44 \cdot (\Delta n \cdot d) + 75$. The slow axis of the second optical compensator more preferably defines an angle of 43 degrees to 47 degrees with respect to orientation directions of liquid crystal molecules in the black display state, particularly preferably defines an angle of approximately 45 degree.

A twisted nematic liquid crystal display device according to still another preferred embodiment of the present invention preferably conducts a display operation in Normally Black mode. The liquid crystal display device preferably includes a liquid crystal cell and two polarizers. The liquid crystal cell preferably includes two substrates, a liquid crystal layer sandwiched between the two substrates, and two alignment layers provided on the two substrates so as to face the liquid crystal layer. The two polarizers preferably face each other with the liquid crystal cell interposed between themselves. The liquid crystal display device preferably further includes a first optical compensator between one of the two polarizers and the liquid crystal cell, and a second optical compensator between the first optical compensator and that polarizer, respectively. The liquid crystal layer preferably has a front retardation $\Delta n \cdot d$ of 390 nm to 550 nm in the black display state. Each of the first and second optical compensators preferably exhibits a retardation, and preferably has a slow axis, within a plane that is defined parallel to the liquid crystal layer. The first optical compensator preferably has an in-plane retardation $Re_1$ of 75 nm to 210 nm, and the slow axis of the first optical compensator preferably defines an angle of 85 degrees to 95 degrees with respect to orientation directions of liquid crystal molecules in the black display state. The liquid crystal molecules are preferably included in the liquid crystal layer and located near one of the two substrates, which is closer to the first optical compensator. The in-plane retardation $Re_2$ of the second optical compensator and the front retardation $\Delta n \cdot d$ of the liquid crystal layer preferably satisfy the inequality $0.44 \cdot (\Delta n \cdot d) + 50 \leq Re_2 \leq 0.44 \cdot (\Delta n \cdot d) + 80$, and the slow axis of the second optical compensator preferably defines an angle of 42 degrees to 48 degrees with respect to orientation directions of the liquid crystal molecules in the black display state.

In one preferred embodiment of the present invention, the first and second optical compensators are preferably located closer to a viewer than the liquid crystal cell is.

In an alternative preferred embodiment, the first and second optical compensators may be located more distant from the viewer than the liquid crystal cell is.

In yet another preferred embodiment, the first optical compensator is preferably a phase film with uniaxial optical anisotropy.

In yet another preferred embodiment, the second optical compensator is preferably a phase film with uniaxial optical anisotropy.

In yet another preferred embodiment, the transmission axis of the other polarizer is preferably either substantially parallel or substantially perpendicular to the orientation directions of the liquid crystal molecules in the black display state. The liquid crystal molecules are preferably included in the liquid crystal layer and preferably located near the substrate that is closer to the first optical compensator.

In yet another preferred embodiment, the liquid crystal layer preferably has a twist angle of 85 degrees to 95 degrees.

A multilayer phase plate with a multilayer structure according to a preferred embodiment of the present invention preferably includes a first layer and a second layer. Each of the first and second layers preferably has a slow axis, and preferably exhibits a retardation, within a plane that is defined parallel to the layer. The first layer preferably has an in-plane retardation of 75 nm to 210 nm. The second layer preferably has an in-plane retardation of 220 nm to 320 nm. The slow axis of the second layer preferably defines an angle of 42 degrees to 48 degrees with respect to the slow axis of the first layer.

In one preferred embodiment of the present invention, the slow axis of the second layer preferably defines an angle of approximately 45 degrees with respect to the slow axis of the first layer.

In another preferred embodiment, the multilayer phase plate is preferably used in a twisted nematic liquid crystal display device for conducting a display operation in Normally Black mode.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, preferred embodiments of the present invention will be described with reference to the accompanying drawings. It should be noted that the present invention is in no way limited to the following specific preferred embodiments.

Figure 1:
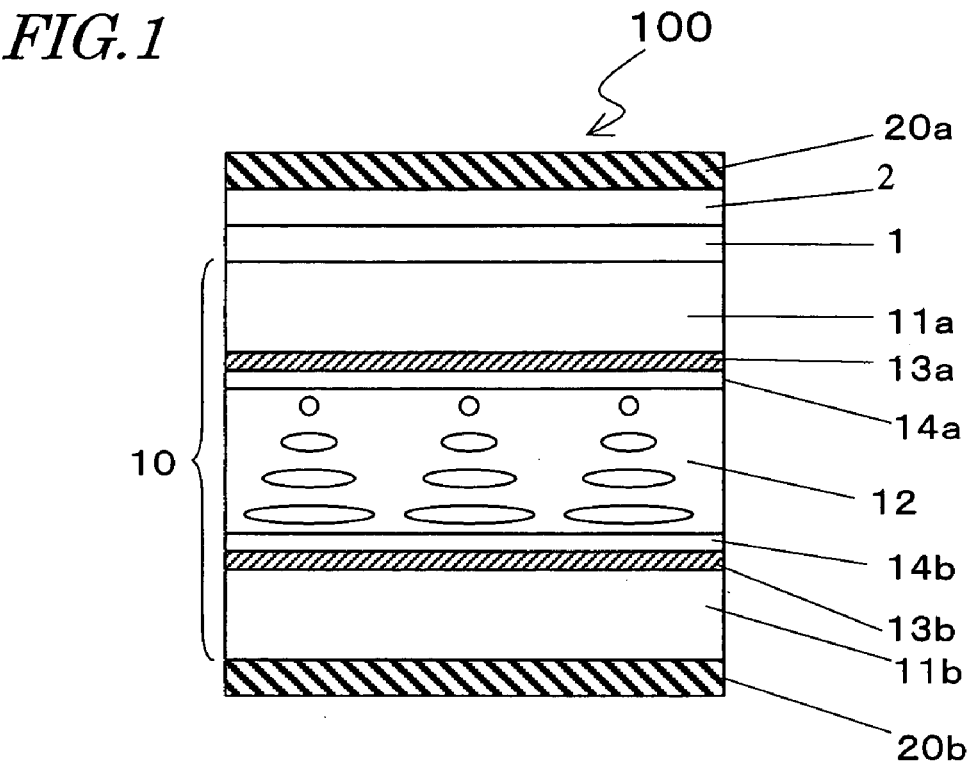
FIG. 1 is a cross-sectional view schematically illustrating an LCD 100 according to a preferred embodiment of the present invention.

FIG. 1 schematically illustrates a configuration for a liquid crystal display (LCD) 100 according to a specific preferred embodiment of the present invention.

As shown in FIG. 1, the LCD 100 preferably includes a liquid crystal cell 10 and two polarizers 20a and 20b, which face each other with the liquid crystal cell 10 sandwiched between them. The LCD 100 is preferably a twisted-nematic (TN) LCD for conducting a display operation in a normally black mode.

The liquid crystal cell 10 preferably includes two substrates 11a and 11b (which will be referred to herein as a "front substrate" and a "rear substrate", respectively) and a liquid crystal layer 12 sandwiched between them. The orientation state of liquid crystal molecules in the liquid crystal layer 12 is preferably controlled by two electrodes 13a and 13b, which are opposed to each other with the liquid crystal layer 12 interposed between them. FIG. 1 schematically illustrates liquid crystal molecules included in the liquid crystal layer 12 to which no voltage is currently applied. The liquid crystal molecules typically have a twist angle of 85 degrees to 95 degrees. Also, in this preferred embodiment, the liquid crystal layer 12 is preferably designed such that the liquid crystal molecules are twisted counterclockwise from the rear substrate 11b toward the front substrate 11a.

If the liquid crystal cell 10 is driven by active-matrix addressing technique, the electrodes 13a and 13b are preferably a pixel electrode, provided for each pixel, and a counter electrode that faces the pixel electrode, respectively, and an active component such as an MIM element or a TFT is preferably provided for each pixel of the liquid crystal cell 10. On the other hand, if the liquid crystal cell 10 is driven by simple-matrix addressing technique, then the electrodes 13a and 13b are preferably striped electrodes.

In this preferred embodiment, two alignment layers 14a and 14b are preferably provided on the front and rear substrates 11a and 11b, respectively, so as to make contact with the liquid crystal layer 12. The alignment layers 14a and 14b may be horizontal alignment films that have already been subjected to a rubbing treatment.

The polarizers 20a and 20b, arranged outside of the liquid crystal cell 10, preferably have their transmission axes defined so that the LCD 100 can conduct a black display operation with no voltage applied to the liquid crystal layer 12.

This LCD 100 conducts a display operation in the normally black mode. Accordingly, unlike the Normally White mode, there is no need to provide any opaque layer for a portion of each pixel that is not covered with the electrode, and therefore, a bright image can be displayed with the aperture ratio increased significantly.

The LCD 100 of this preferred embodiment preferably further includes a first optical compensator 1 and a second optical compensator 2. The first optical compensator 1 is preferably provided between the polarizer 20a that is located closer to the viewer and the liquid crystal cell 10. On the other hand, the second optical compensator 2 is preferably provided between the first optical compensator 1 and the polarizer 20a. Hereinafter, the functions of the first and second optical compensators 1 and 2 will be described in detail.

Figure 2:
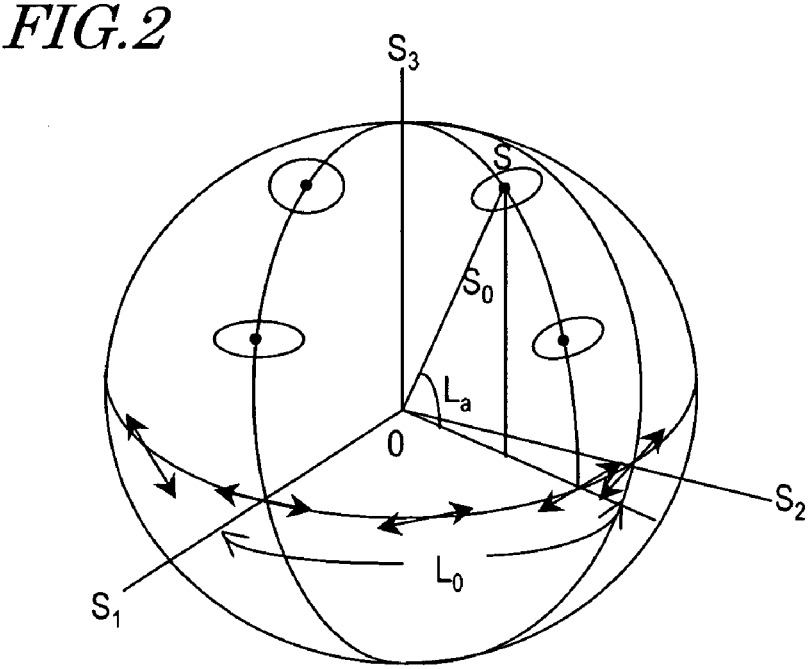
FIG. 2 shows a Poincaré sphere.

First, the polarization state of light that has been transmitted through the liquid crystal layer 12 in the black display state will be described using a Poincaré sphere. As shown in FIG. 2, the Poincaré sphere is defined by Stokes parameters $S_0$, $S_1$, $S_2$ and $S_3$ representing polarization states and its radius is defined by the Stokes parameter $S_0$ (intensity) when the three axes of an orthogonal coordinate system are defined by the other three Stokes parameters $S_1$, $S_2$ and $S_3$. That is to say, the polarization state of the outgoing light is represented by a point on this Poinxaré sphere. Such a representation method is called a "Poincaré sphere representation".

As for a given point S on the Poincaré sphere, the latitude La thereof is obtained by doubling the ellipticity angle, the longitude Lo thereof is obtained by doubling the azimuth angle of the elliptical major axis, and a positive ellipticity angle represents a right circularly polarized light. Accordingly, right polarized light rays are represented on the northern hemisphere of the Poincaré sphere while left polarized light rays are represented on the southern hemisphere. Also, a light ray with an ellipticity angle of zero degrees (i.e., linearly polarized light ray) is represented on the equator, a right circularly polarized light ray is represented on the north pole, and a left circularly polarized light ray is represented on the south pole.

Figure 3A:
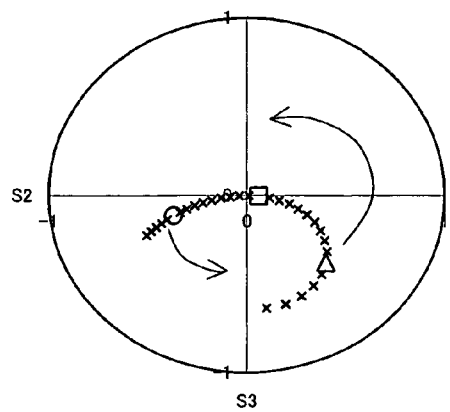
FIGS. 3A and 3B show the polarization states of light rays that have passed through a liquid crystal layer.
Figure 3B:
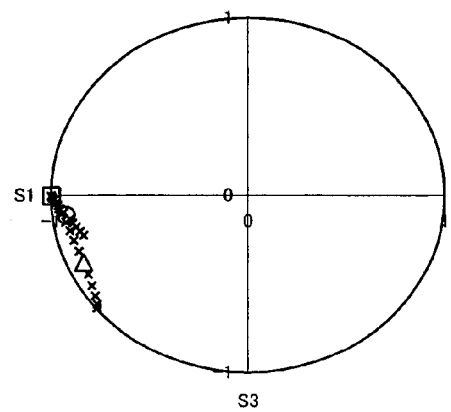

FIGS. 3A and 3B show the polarization state of a light ray that entered the liquid crystal layer 12 as a linearly polarized light ray by way of the polarizer 20b in the black display state and then left the liquid crystal layer 12. Specifically, FIG. 3A is the orthogonal projection of points on the Poincaré sphere onto a plane that is defined by the $S_2$ and $S_3$ axes, while FIG. 3B is the orthogonal projection of points on the Poincaré sphere onto a plane that is defined by the $S_1$ and $S_3$ axes. FIGS. 3A and 3B show light rays with wavelengths of 400 nm to 700 nm. In this case, the front retardation $\Delta n \cdot d$ of the liquid crystal layer 12 is 480 nm, thus satisfying the first minimum condition with respect to the light with a wavelength of 550 nm. It should be noted that the "front retardation $\Delta n \cdot d$" is the retardation exhibited by the liquid crystal layer 12 with respect to a light ray that has been incident perpendicularly to the surface of the layer (i.e., in the thickness direction).

In FIG. 3A, different $S_2$ coordinates mean different major-axis directions of polarized light rays, and $S_2=0$ represents that the major-axis direction of a polarized light ray is perpendicular to the polarization direction of a linearly polarized light ray that is going to enter the liquid crystal layer 12. As used herein, the "major-axis direction of a polarized light ray" refers to not only the elliptical major-axis direction of an elliptically polarized light ray but also the polarization direction of a linearly polarized light ray unless otherwise stated. Also, in FIGS. 3A and 3B, different $S_3$ coordinates mean different ellipticities of polarized light rays. Specifically, $S_3=0$ represents a linearly polarized light ray, $S_3=1$ represents a right circularly polarized light ray, and $S_3=-1$ represents a left circularly polarized light ray.

As shown in FIG. 3A, the major-axis direction of a polarized light ray with a wavelength of 550 nm (as indicated by the open square □) is perpendicular to the polarization direction of the linearly polarized light ray entering the liquid crystal layer 12. Meanwhile, a polarized light ray with any other wavelength (e.g., a polarized light ray with a wavelength of 450 nm as indicated by the open triangle △ or a polarized light ray with a wavelength of 650 nm as indicated by the open circle ○) has a different major-axis direction from the light with the wavelength of 550 nm. Also, the polarized light ray with the wavelength of 550 nm is a linearly polarized light ray, whereas the polarized light rays with other wavelengths are not linearly polarized light rays but elliptically polarized light rays.

As can be seen, in the TN LCD 100, not all of the light transmitted through the liquid crystal layer 12 in the black display state but just a portion of the light with a particular wavelength (i.e., the light ray with the wavelength of 550 nm in this example) is the desired linearly polarized light ray. Thus, a polarized light ray, transmitted through the liquid crystal layer 12, may have any of various major-axis directions and ellipticities that change with the wavelength. That is to say, the "angle of rotation" and "ellipticity" of the polarized light ray that has passed through the liquid crystal layer 12 in the black display state have wavelength dependence (or wavelength dispersion). The "angle of rotation" of a polarized light ray represents the variation caused in the major-axis direction of the polarized light ray by the liquid crystal layer 12 in degrees. The "ellipticity" of a polarized light ray is the ratio of the major axis of an ellipse, drawn by the electric vector of the polarized light ray on a plane perpendicular to the propagation direction, to the minor axis thereof. Accordingly, a linearly polarized light ray has an ellipticity of zero, while a circularly polarized light ray has an ellipticity of one.

The first optical compensator 1 of the LCD 100 preferably compensates for the wavelength dependence (or wavelength dispersion) of the "angle of rotation" of a polarized light ray that has passed through the liquid crystal layer 12 in the black display state.

In the polarized light passing through the liquid crystal layer 12 in the black display state, the first optical compensator 1 typically has functions of hardly changing the polarization direction of a linearly polarized light ray having a particular wavelength but substantially aligning the elliptical major-axis direction of an elliptically polarized light ray, having a wavelength that is shorter or longer than the particular wavelength, with the polarization direction of the linearly polarized light ray. In this preferred embodiment, the first optical compensator 1 preferably hardly changes the major-axis direction of the polarized light ray having the wavelength of 550 nm, which has already achieved the desired polarization state, and preferably substantially aligns the major-axis direction of a polarized light ray having another wavelength with the major-axis direction of the polarized light ray having the wavelength of 550 nm.

The first optical compensator 1 having these functions is preferably arranged so that the first optical compensator 1 has a slow axis within a plane that is defined parallel to the liquid crystal layer 12 and that this slow axis is substantially perpendicular to the orientation control direction of the alignment layer 14a that is located closer to the first optical compensator 1. That is to say, the first optical compensator 1 is preferably arranged such that the slow axis thereof is substantially perpendicular to the orientation directions of liquid crystal molecules near the substrate 11a that is located closer to the first optical compensator 1 in the black display state. By adopting such an arrangement, no phase difference will be created in the light having the wavelength of 550 nm but a phase difference can be created in a light ray having another wavelength. As a result, the major-axis direction of a polarized light ray having another wavelength can be changed substantially without changing the major-axis direction of the polarized light ray having the wavelength of 550 nm.

The variation caused in the polarization state by the passage of light through the first optical compensator 1 having such a slow axis is equivalent to rotating any point on the graph shown in FIG. 3A counterclockwise around the $S_2=0$ and $S_3=0$ point. Accordingly, the longitude of a light ray having another wavelength may be changed without changing that of the light ray having the wavelength of 550 nm as originally represented by the $S_2=0$ and $S_3=0$ point.

In the graph shown in FIG. 3A, the degree of rotation changes with the magnitude of the retardation that the first optical compensator 1 has within the plane that is defined parallel to the liquid crystal layer 12. Accordingly, by appropriately adjusting the magnitude of the in-plane retardation $Re_1$ of the first optical compensator 1, the degree of rotation on the graph shown in FIG. 3A and the variation in the major-axis direction of the polarized light ray can be both controlled.

However, as can be seen from FIG. 3A, the light rays having respective wavelengths, which have passed through the liquid crystal layer 12, are neither arranged along the equator on the Poincaré sphere nor distributed in line on the graph shown in FIG. 3A. For that reason, to further reduce the variation in longitude and the shift in the major-axis direction of the polarized light ray, light rays preferably have their rotation degrees changed according to their respective wavelengths rather than being rotated to the same degree irrespective of their wavelengths.

For example, if the first optical compensator 1 has an in-plane retardation $Re_1$, which is one-fourth as large as the wavelength of a light ray, then that light ray is rotated approximately 90 degrees counterclockwise on the graph shown in FIG. 3A. However, if the first optical compensator 1 functioned as a λ/4 plate for a light ray with any wavelength, then every light ray with any wavelength would be rotated approximately 90 degrees counterclockwise. Then, it would be difficult to arrange all of those light rays with various wavelengths on the same longitude.

In this preferred embodiment, light rays having wavelengths that are shorter than 550 nm and light rays having wavelengths that are longer than 550 nm are preferably distributed in the regions where $S_3<0$ as shown in FIGS. 3A and 3B. Accordingly, by rotating a light ray having a wavelength shorter than 550 nm by an angle greater than 90 degrees and a light ray having a wavelength longer than 550 nm by an angle smaller than 90 degrees, respectively, the shift in the major-axis direction of the polarized light ray can be further reduced.

To appropriately define a degree of rotation according to the wavelength, the wavelength dispersion characteristic of the in-plane retardation $Re_1$ of the first optical compensator 1 can be used. Supposing the in-plane retardation of the first optical compensator 1 with respect to a light ray having a wavelength λ is identified by $Re_{1,\lambda}$, the degree of rotation $\theta_1$ of a light ray having the wavelength λ on the graph shown in FIG. 3A or 3B is given by:

$$\theta_1 = 360 \times Re_{1,\lambda}/\lambda \text{ (degrees)}$$

Accordingly, by appropriately defining $Re_{1,\lambda}$, a light ray with any wavelength can have its desired degree $\theta_1$ of rotation, the shift in the major-axis direction of a polarized light ray can be further reduced, and the major-axis directions of polarized light rays can be substantially aligned with each other.

By defining the slow axis and the wavelength dispersion characteristic of the in-plane retardation $Re_1$ of the first optical compensator 1 to be predetermined ones (i.e., such that the major-axis directions of polarized light rays can be aligned with each other) according to the wavelength dependence of the angle of rotation of the polarized light passing through the liquid crystal layer 12 in the black display state, the first optical compensator 1 can perform its intended functions.

Figure 4:
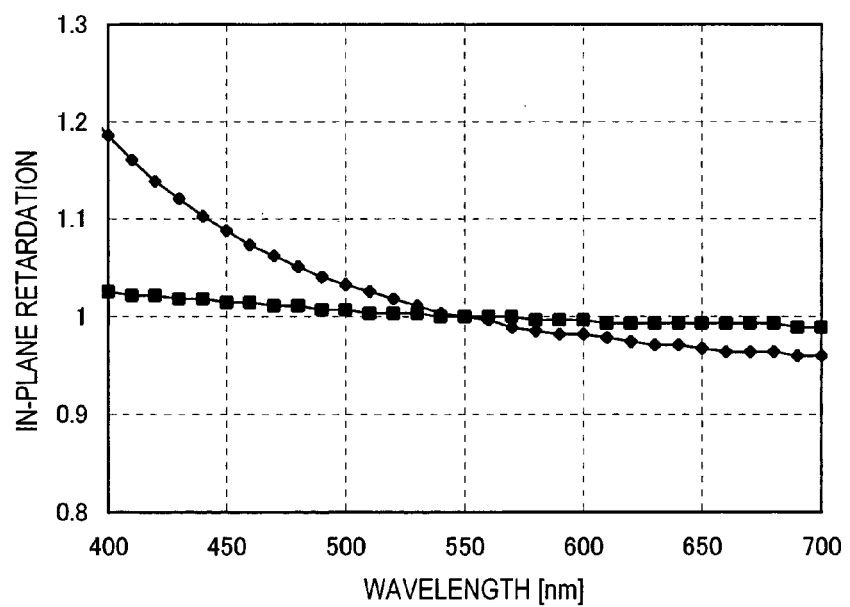
FIG. 4 is a graph showing the wavelength dispersion characteristic of the in-plane retardation of a phase film made of polycarbonate and that of the in-plane retardation of a phase film made of polyvinyl alcohol.

As the first optical compensator 1, a phase film, which is made of polycarbonate with uniaxial optical anisotropy, has an in-plane retardation $Re_1$ of 138 nm with respect to a light ray having a wavelength of 550 nm, and has a wavelength dispersion characteristic as indicated by the solid diamond ♦ in FIG. 4, is preferably used. In FIG. 4, the in-plane retardation with respect to a light ray having a wavelength of 550 nm is one.

Figure 5A:
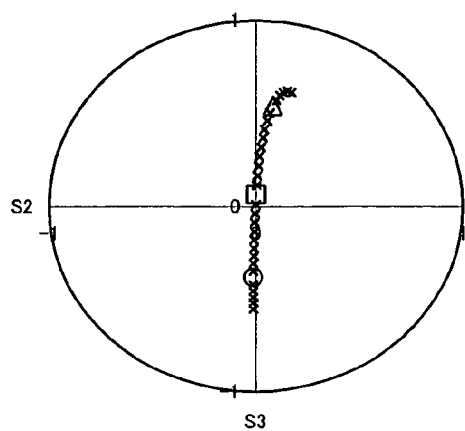
FIGS. 5A and 5B show the polarization states of light rays that have passed through a first optical compensator.
Figure 5B:
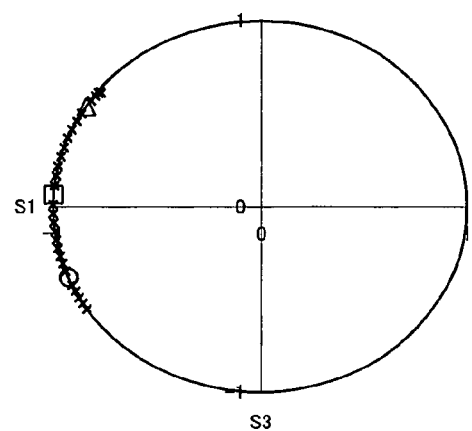

FIGS. 5A and 5B show the polarization state of a light ray that has passed through the liquid crystal layer 12 and the first optical compensator 1. Specifically, FIG. 5A is the orthogonal projection of points on the Poincaré sphere onto a plane that is defined by the $S_2$ and $S_3$ axes, while FIG. 5B is the orthogonal projection of points on the Poincaré sphere onto a plane that is defined by the $S_1$ and $S_3$ axes. As shown in FIG. 5A, by passing a light ray with any wavelength through the first optical compensator 1, the $S_2$ value of the light ray can be substantially equalized with that of the light ray having the wavelength of 550 nm. As a result, the major-axis directions of light rays having respective wavelengths can be substantially aligned with each other. To make the second optical compensator 2 perform its optical compensation as easily as possible, the variation in the major-axis direction of the polarized light ray is preferably minimized.

As described above, the polarized light rays that have passed through the first optical compensator 1 show little variation in their major-axis directions over the entire wavelength range. Nevertheless, the $S_3$ value (i.e., the latitude on the Poincaré sphere) of the light ray that has passed through the first optical compensator 1 changes with its wavelength. Accordingly, the outgoing light ray includes not just linearly polarized components but also elliptically polarized components. That is to say, at this point in time, the ellipticity of the light still exhibits wavelength dependence (i.e., wavelength dispersion).

Thus, the second optical compensator 2 is preferably provided so as to compensate for the wavelength dependence (or wavelength dispersion) of the "ellipticity" of the polarized light ray that has passed through the liquid crystal layer 12 in the black display state.

In the polarized light passing through the liquid crystal layer 12 in the black display state, the second optical compensator 2 typically has functions of passing the linearly polarized light ray having the particular wavelength as it is but changing the elliptically polarized light ray, having the wavelength that is shorter or longer than the particular wavelength, into a substantially linearly polarized light ray. In this preferred embodiment, the second optical compensator 2 preferably passes a linearly polarized light ray having a wavelength of 550 nm as it is and preferably changes an elliptically polarized light ray, having any other wavelength, into a substantially linearly polarized light ray.

The second optical compensator 2 having such functions is preferably arranged so that the second optical compensator 2 has a slow axis within a plane that is defined parallel to the liquid crystal layer 12 and that the slow axis defines an angle of approximately 45 degrees counterclockwise with respect to the orientation control direction of the alignment layer 14a when the liquid crystal cell 10 is viewed from the second optical compensator 2. That is to say, the second optical compensator 2 is preferably arranged such that the slow axis thereof defines an angle of approximately 45 degrees with respect to the orientation directions of liquid crystal molecules in the black display state near the substrate 11a that is located closer to the second optical compensator 2.

The variation caused in the polarization state by the passage of light through the second optical compensator 2 having such a slow axis is equivalent to rotating any point on the graph shown in FIG. 5B counterclockwise around the $S_1=0$ and $S_3=0$ point. In the graph shown in FIG. 5B, the degree of rotation changes with the magnitude of the retardation that the second optical compensator 2 has within the plane that is defined parallel to the liquid crystal layer 12. Accordingly, by appropriately adjusting the magnitude of the in-plane retardation $Re_2$ of the second optical compensator 2, the degree of rotation on the graph shown in FIG. 5B and the variation in the ellipticity of the polarized light ray can be both controlled. It should be noted that if the liquid crystal molecules in the liquid crystal layer 12 are twisted in a different direction (i.e., if the liquid crystal layer 12 is designed such that the liquid crystal molecules are twisted clockwise from the substrate 11b toward the substrate 11a), then the second optical compensator 2 is preferably arranged such that the slow axis thereof defines an angle of approximately 45 degrees clockwise with respect to the orientation directions of liquid crystal molecules in the black display state near the substrate 11a that is located closer to the viewer. Then, similar functions are achieved, too.

In this case, to pass the linearly polarized light ray having the wavelength of 550 nm as it is, the in-plane retardation $Re_2$ of the second optical compensator 2 may be adjusted such that the light ray having the wavelength of 550 nm is rotated approximately 180 degrees, for example.

Nevertheless, as can be seen from FIGS. 5A and 5B, the light rays having respective wavelengths, which have passed through the liquid crystal layer 12 and then the first optical compensator 1, have mutually different latitudes on the Poincaré sphere and respectively different $S_3$ values (i.e., ellipticities). Accordingly, even if all of those light rays are rotated approximately 180 degrees uniformly irrespective of their wavelengths, the wavelength dependence of the ellipticity still cannot be compensated for. Thus, the degree of rotation needs to be changed with the wavelength.

In this preferred embodiment, light rays having wavelengths that are shorter than 550 nm are distributed in the regions where $S_3>0$ and light rays having wavelengths that are longer than 550 nm are distributed in the regions where $S_3<0$ as shown in FIGS. 5A and 5B. Accordingly, by rotating those light rays having wavelengths of less than 550 nm by angles greater than 180 degrees and those light rays having wavelengths of more than 550 nm by angles smaller than 180 degrees, the wavelength dependence of the ellipticity can be compensated for.

To appropriately define a degree of rotation according to the wavelength, the wavelength dispersion characteristic of the in-plane retardation $Re_2$ of the second optical compensator 2 can be used. Supposing the in-plane retardation of the second optical compensator 2 with respect to a light ray having a wavelength $\lambda$ is identified by $Re_{2,\lambda}$, the degree of rotation $\theta_2$ of a light ray having the wavelength $\lambda$ on the graph shown in FIG. 5B is given by:

$$\theta_2 = 360 \times Re_{2,\lambda}/\lambda \text{ (degrees)}$$

Accordingly, by appropriately defining $Re_{2,\lambda}$, a light ray with any wavelength can have its desired degree $\theta_2$ of rotation, and the wavelength dependence of the ellipticity can be compensated for.

By defining the slow axis and the wavelength dispersion characteristic of the in-plane retardation $Re_2$ of the second optical compensator 2 to be predetermined ones (i.e., such that the ellipticities of polarized light rays can be matched with each other) according to the wavelength dependence of the ellipticity of the polarized light passing through the liquid crystal layer 12 in the black display state, the second optical compensator 2 can perform its intended functions.

As the second optical compensator 2, a phase film, which is made of polyvinyl alcohol with uniaxial optical anisotropy, functions as a $\lambda/2$ plate with respect to the light ray having a wavelength of 550 nm and has a wavelength dispersion characteristic as indicated by the solid square ■ in FIG. 4, is preferably used.

Figure 6A:
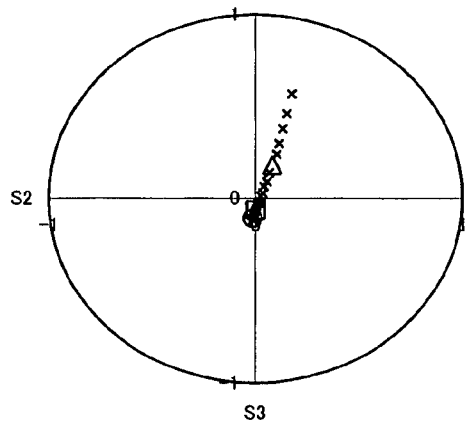
FIGS. 6A and 6B show the polarization states of light rays that have passed through a second optical compensator.
Figure 6B:
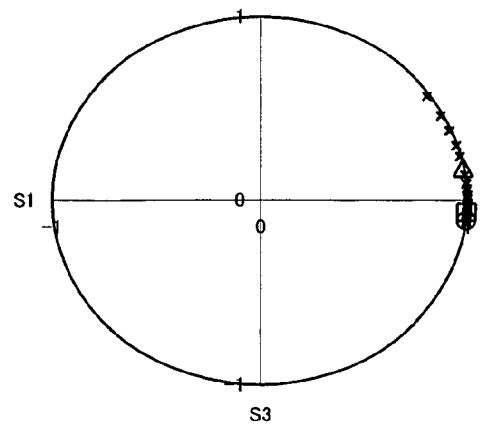

FIGS. 6A and 6B show the polarization states of light rays that have passed through the first and second optical compensators 1 and 2. As shown in FIGS. 6A and 6B, by passing a light ray with any wavelength through the second optical compensator 2, the $S_3$ value of the light ray can be approximately equal to zero and the light ray can be turned into a substantially linearly polarized light ray. In this case, the $S_2$ value of a light ray with any wavelength is also approximately equal to zero and the major-axis directions of polarized light rays are substantially aligned with each other. Thus, the light rays that have passed through the first and second optical compensators 1 and 2 are linearly polarized light rays that have the same polarization direction in almost the entire visible radiation range (among other things, in the range of 450 nm to 650 nm as indicated by Δ, □ and ○). Accordingly, by arranging the polarizer 20a closer to the viewer (which will be referred to herein as a "front polarizer") and the polarizer 20b less close to the viewer (which will be referred to herein as a "rear polarizer") so as to satisfy a predetermined relationship (e.g., as crossed-Nicols in this preferred embodiment), the light ray that has passed through the liquid crystal layer 12 in the black display state can be cut off by the front polarizer 20a highly efficiently in almost the entire visible radiation range, thus minimizing the unwanted coloring of the black display. As a result, the LCD 100 realizes a high contrast ratio display.

Figure 7:
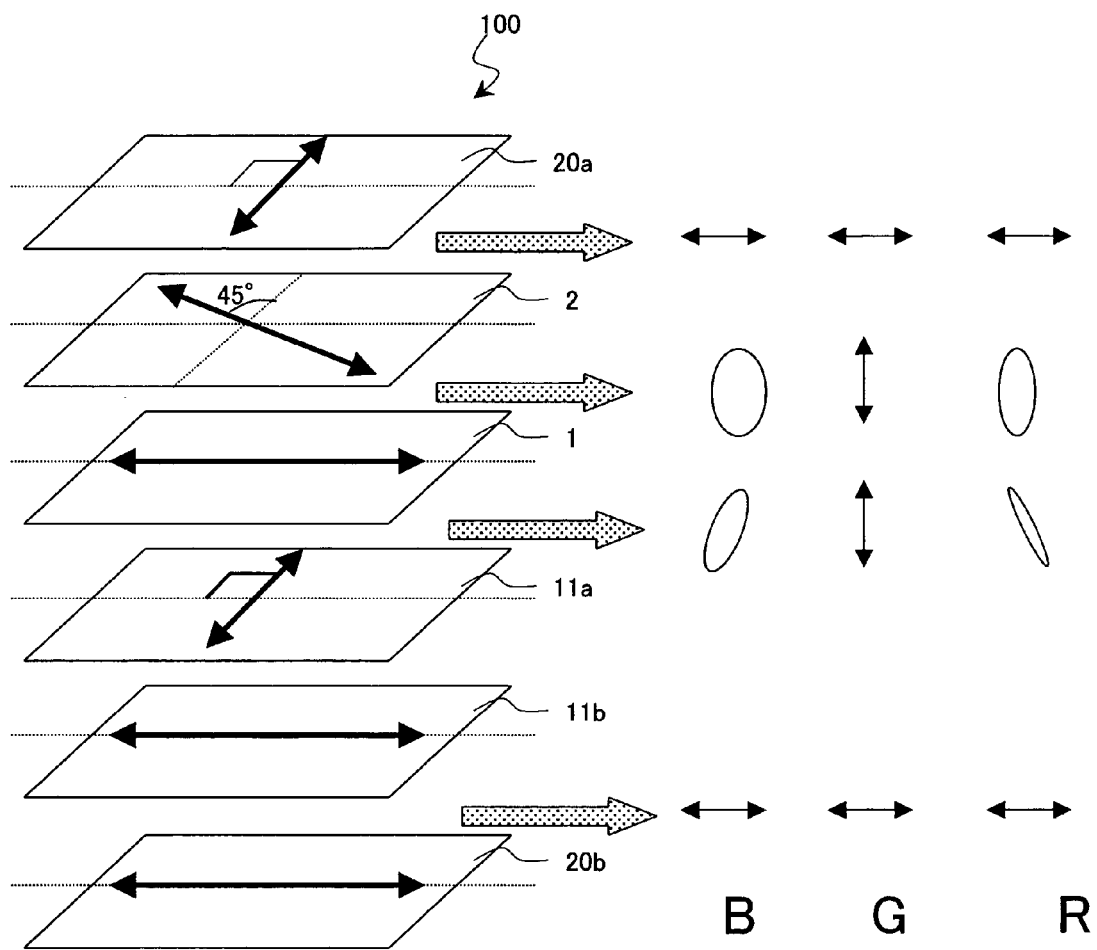
FIG. 7 schematically shows how a light ray changes its polarization states while passing through the LCD 100 in a black display state.

Hereinafter, it will be briefly summarized with reference to FIG. 7 how light rays change their polarization states while passing through the LCD 100 in the black display state. In FIG. 7, the respective members of the LCD 100 are schematically illustrated on the left-hand side, while the polarization states of the light rays passing through those members are schematically shown on the right-hand side for the three primary colors of R, G and B. Also, in FIG. 7, the arrows on the polarizers 20a and 20b represent their transmission axes, the arrows on the substrates 11a and 11b respectively represent the orientation directions of liquid crystal molecules that are located near the substrates 11a and 11b in the black display state (i.e., the orientation control directions of the alignment layers 14a and 14b), and the arrows on the first and second optical compensators 1 and 2 represent the slow axes thereof.

The light emitted from a backlight (not shown) will be turned into a linearly polarized light ray, of which the polarization direction is parallel to the transmission axis of the rear polarizer 20b, when leaving the rear polarizer 20b. Next, while passing through the liquid crystal layer 12 to which no voltage is being applied, this linearly polarized light ray has its polarization direction rotated approximately 90 degrees due to the optical rotatory power of the liquid crystal layer 12 in this case, however, a G ray is a linearly polarized light ray of which the polarization direction has rotated precisely 90 degrees, while a B ray and an R ray are elliptically polarized light rays having different elliptical major-axis directions from that of the G ray.

While these light rays are passing through the first optical compensator 1, the elliptical major-axis directions of the B and R rays are substantially aligned with the polarization direction of the G ray. In this manner, the wavelength dependence of the angle of rotation is compensated for. And while these light rays are passing through the second optical compensator 2 after that, the elliptically polarized B and R rays are turned into linearly polarized light rays, and the wavelength dependence of the ellipticity is compensated for as well. Consequently, the R, G and B rays are now all linearly polarized light rays with the same polarization direction.

After having their wavelength dependences of the angle of rotation and ellipticity compensated for in this manner, those light rays are now linearly polarized light rays, of which the polarization direction is perpendicular to the transmission axis of the front polarizer 20a. Accordingly, most of those light rays are absorbed into the polarizer 20a.

As described above, the LCD 100 of this preferred embodiment preferably includes the first optical compensator 1 that compensates for the wavelength dependence of the angle of rotation of a polarized light ray passing through the liquid crystal layer 12 in the black display state and the second optical compensator 2 that compensates for the wavelength dependence of the ellipticity thereof. Thus, the LCD 100 can conduct a display operation at a high contrast ratio with unwanted coloring of the black display minimized. Also, according to the preferred embodiment of the present invention described above, the wavelength dependence of the angle of rotation and that of the ellipticity are separately compensated for by the first optical compensator 1, which is located relatively close to the liquid crystal layer 12, and by the second optical compensator 2, which is located relatively distant from the liquid crystal layer 12, respectively. Accordingly, each of the first and second optical compensators 1 and 2 may have a configuration simple enough, and may be used easily enough, to cut down the manufacturing cost significantly.

As the first and second optical compensators 1 and 2, a phase film with uniaxial optical anisotropy may be used. That is to say, each of the first and second optical compensators 1 and 2 may be a single phase film, and therefore, there is no need to stack a lot of phase films one upon the other. As a result, the LCD 100 can have a reduced thickness.

If an optical element with a simple configuration (e.g., a uniaxial phase film) is used as the first optical compensator 1, then the first optical compensator 1 is preferably designed so as to not change the major-axis direction of a polarized light ray having a particular wavelength but to align the major-axis direction of a polarized light ray having any other wavelength with that of the polarized light ray having the particular wavelength. This is because it is not easy to change the major-axis directions of polarized light rays having various wavelengths so as to align those directions with each other by using an optical element having such a simple configuration as a uniaxial phase film. It should be noted that the particular wavelength, at which the major-axis directions of the polarized light rays are fixed while the first optical compensator 1 is doing its optical compensation, is preferably equal to the wavelength at which the light ray passing through the liquid crystal layer in the black display state achieves the desired polarization state. In the preferred embodiment described above, this particular wavelength is supposed to be 550 nm, which is included in the wavelength range representing a green ray. However, the particular wavelength is not always limited to this value, but preferably falls within the range of 450 nm to 600 nm. Also, if the particular wavelength is included in the wavelength range of 500 nm to 600 nm in which high luminosity is achieved, good brightness and contrast ratio are both achieved. On the other hand, if the particular wavelength is included in the wavelength range of 450 nm to 500 nm, then the resultant brightness and contrast ratio will decrease slightly but good white display is still realized.

The second optical compensator 2 typically has the functions of passing a linearly polarized light ray having the particular wavelength as it is (and such that its polarization direction rotates 90 degrees) and changing an elliptically polarized light ray having any other wavelength into a substantially linearly polarized light ray. According to the preferred embodiment of the present invention, the wavelength dependence of the angle of rotation is compensated for by a uniaxial phase film that is located relatively close to the liquid crystal layer 12. Thus, even if the second optical compensator 2 is an optical element having a simple configuration such as a uniaxial phase film, the second optical compensator 2 can still achieve these functions.

To get the optical compensation done by the first optical compensator 1 just as intended, the slow axis and the wavelength dispersion characteristic of the in-plane retardation $Re_1$ of the first optical compensator 1 are preferably adjusted into predetermined ones according to the wavelength dependence of the angle of rotation of the polarized light passing through the liquid crystal layer 12 in the black display state.

Also, to get the optical compensation done by the second optical compensator 2 just as intended, the slow axis and the wavelength dispersion characteristic of the in-plane retardation $Re_2$ of the second optical compensator 2 are preferably adjusted into predetermined ones according to the wavelength dependence of the ellipticity of the polarized light passing through the liquid crystal layer 12 in the black display state.

The LCD 100 according to the preferred embodiment of the present invention described above may be fabricated in the following manner, for example.

First, two substrates (made of glass, for example) 11a and 11b are preferably prepared. Next, a transparent conductive layer (e.g., an ITO film) is preferably deposited to a thickness of 100 nm to 140 nm on each of the two substrates 11a and 11b by a sputtering technique, and then preferably patterned by a photolithographic process, thereby forming transparent electrodes 13a and 13b on the substrates 11a and 11b, respectively.

Subsequently, horizontal alignment films 14a and 14b are preferably deposited to a thickness of 50 nm on the transparent electrodes 13a and 13b on the substrates 11a and 11b, respectively, by a spin coating technique, and then preferably subjected to a rubbing treatment. In this process step, the rubbing treatment is preferably performed on the horizontal alignment films 14a and 14b such that the resultant rubbing directions thereof will be perpendicular to each other when the substrates 11a and 11b are opposed to each other.

Next, the substrates 11a and 11b are preferably bonded together so as to have a cell gap of 5.2 μm between them. More specifically, after plastic spacers have been dispersed on one of the two substrates, the two substrates 11a and 11b are preferably opposed to each other and then a thermosetting adhesive, printed around the display area, is preferably cured, thereby fixing the two substrates to each other.

Thereafter, a liquid crystal material is preferably injected into the gap between the two substrates 11a and 11b by a vacuum injection process, thereby forming a liquid crystal layer 12. In this preferred embodiment, a mixture of a nematic liquid crystal material having a refractive index anisotropy Δn of 0.0924 and 0.15 wt % of optically active substance CB15 is preferably used as the liquid crystal material. In this process step, the liquid crystal material is preferably prepared such that liquid crystal molecules in the liquid crystal layer 12 have a twist angle of 90 degrees and the liquid crystal layer 12 has a front retardation Δn·d of 480 nm while no voltage is being applied thereto. The liquid crystal layer 12 is preferably also designed such that the liquid crystal molecules are twisted counterclockwise from the rear substrate 11b toward the front substrate 11a.

A liquid crystal cell 10 obtained in this manner satisfies the first minimum condition with respect to the light ray having the wavelength of 550 nm.

Next, a uniaxial phase film 1, which is made of polycarbonate and has an in-plane retardation $Re_1$ of 140 nm, is preferably provided as the first optical compensator 1 on the front substrate 11a. In this process step, the phase film 1 is preferably arranged such that the orientation directions of liquid crystal molecules near the front substrate 11a are perpendicular to the slow axis of the phase film 1. In this preferred embodiment, the phase film 1 is preferably made of polycarbonate because the refractive index anisotropy of polycarbonate exhibits a desired wavelength dispersion characteristic contributing to aligning the major-axis directions of light rays passing through the liquid crystal layer 12 made of that liquid crystal material. However, if the liquid crystal layer 12 has a different twist angle or if the liquid crystal material has a different optical physical property value, then the preferred wavelength dispersion characteristic of the first optical compensator 1 may also change. Accordingly, the material of the phase film 1 may be selected according to the twist angle of the liquid crystal layer 12 and/or the optical physical property value of the liquid crystal material.

Thereafter, a uniaxial phase film 2, which is made of polyvinyl alcohol and has an in-plane retardation $Re_2$ of 270 nm, is preferably provided as the second optical compensator 2 on the phase film 1. In this process step, the phase film 2 is preferably arranged such that the slow axis of the phase film 2 defines an angle of 45 degrees clockwise with respect to that of the phase film 1 as viewed from over the liquid crystal cell 10 (i.e., from the viewer), i.e., such that the slow axis of the phase film 2 defines an angle of 45 degrees counterclockwise with respect to the orientation directions of liquid crystal molecules near the front substrate 11a. It should be noted that if the liquid crystal molecules in the liquid crystal layer 12 are twisted in the opposite direction (i.e., clockwise), then the phase film 2 is preferably arranged such that the slow axis of the phase film 2 defines an angle of approximately 45 degrees clockwise with respect to the orientation directions of liquid crystal molecules near the front substrate 11a in the black display state. In this preferred embodiment, the phase film 2 is preferably made of polyvinyl alcohol because the refractive index anisotropy of polyvinyl alcohol exhibits a desired wavelength dispersion characteristic contributing to changing a polarized light ray passing through the liquid crystal layer 12 made of that liquid crystal material into a substantially linearly polarized light ray over the entire wavelength range. However, if the liquid crystal layer 12 has a different twist angle or if the liquid crystal material has a different optical physical property value, then the preferred wavelength dispersion characteristic of the second optical compensator 2 may also change. Accordingly, the material of the phase film 2 may be selected according to the twist angle of the liquid crystal layer 12 and/or the optical physical property value of the liquid crystal material.

Thereafter, a rear polarizer 20b is preferably arranged such that the transmission axis of the rear polarizer 20b becomes substantially parallel to the orientation directions of liquid crystal molecules in the vicinity of the rear substrate 11b. Finally, a front polarizer 20a is preferably arranged such that the two polarizers 20a and 20b define crossed Nicols, thereby completing the LCD 100. Alternatively, the rear polarizer 20b may also be arranged such that the transmission axis of the rear polarizer 20b becomes substantially perpendicular to the orientation directions of liquid crystal molecules in the vicinity of the rear substrate 11b, and the front polarizer 20a may also be arranged such that the two polarizers 20a and 20b define crossed Nicols.

Figure 8A:
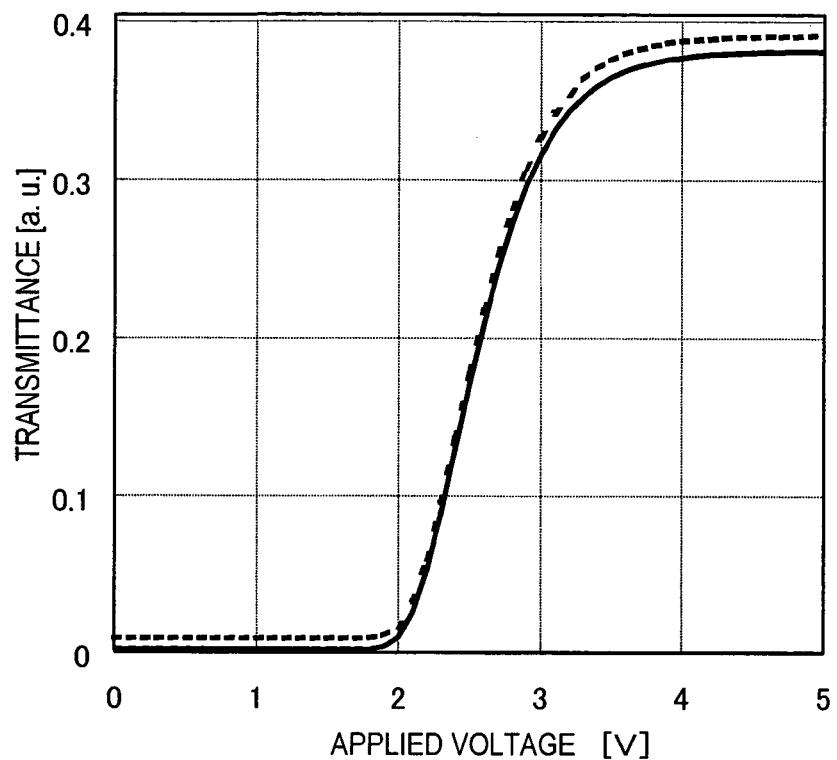
FIG. 8A is a graph showing the electro-optical characteristic of the LCD 100.

FIG. 8A shows the electro-optical characteristic of the LCD 100 fabricated in this manner. For the purpose of comparison, FIG. 8A also shows the electro-optical characteristic of a conventional LCD as a comparative example, having almost the same configuration as the LCD 100 but including neither the first optical compensator 1 nor the second optical compensator 2.

As shown in FIG. 8A, in the black display state, the transmittance of the LCD 100 as represented by the solid curve is lower than that of the conventional LCD as represented by the dashed curve. Thus, it can be seen that the LCD 100 realizes even darker black display and increased contrast ratio. Specifically, the LCD of the comparative example achieves a contrast ratio of just 50, whereas the LCD 100 of this preferred embodiment achieves a contrast ratio as high as 300 or even more. As a result, high quality display is realized.

Figure 8B:
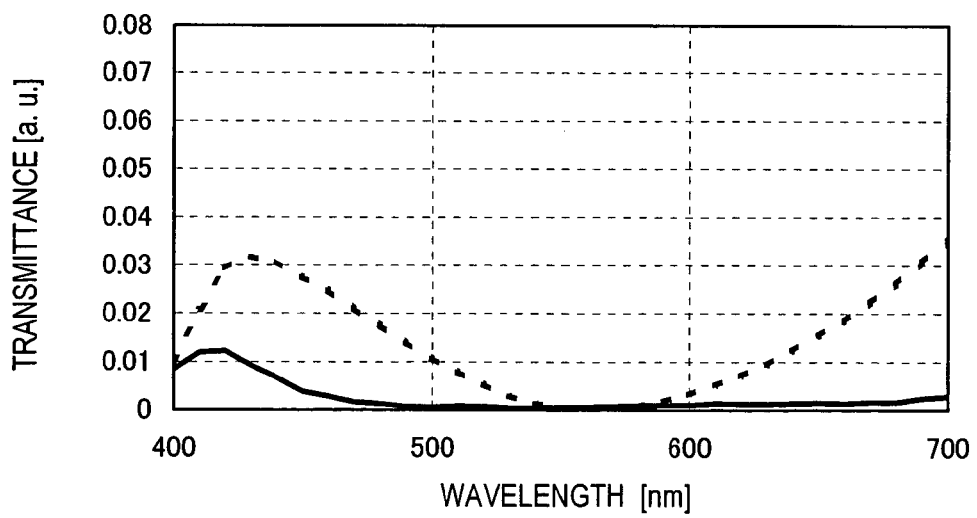
FIG. 8B is a graph showing a spectral transmission characteristic of the LCD 100 in the black display state.

FIG. 8B shows the spectral transmission characteristic of the LCD 100 in the black display state. As shown in FIG. 8B, in the black display state, the transmittance of the LCD 100 as represented by the solid curve is lower than that of the conventional LCD as represented by the dashed curve over the entire visible radiation range. Thus, it can be seen that the LCD 100 realizes good black display.

In the preferred embodiment described above, the first optical compensator 1 is preferably made of polycarbonate and the second optical compensator 2 is preferably made of polyvinyl alcohol. However, the materials of the first and second optical compensators 1 and 2 are never limited to these. Instead, the material of the first optical compensator 1 may be selected in view of its refractive index anisotropy and its wavelength dispersion characteristic of the refractive index anisotropy so as to effectively compensate for the wavelength dependence of the angle of rotation of any polarized light ray passing through the liquid crystal layer 12 in the black display state. Also, the material of the second optical compensator 2 may be selected in view of its refractive index anisotropy and its wavelength dispersion characteristic of the refractive index anisotropy so as to effectively compensate for the wavelength dependence of the ellipticity of any polarized light ray passing through the liquid crystal layer 12 in the black display state.

Also, in the preferred embodiment described above, phase films with uniaxial optical anisotropy are preferably used as the first and second optical compensators 1 and 2. Alternatively, any other type of optical elements with optically compensating capability may also be used. As another alternative, any other compensating capability may be added to the first and/or second optical compensator(s) 1 and/or 2. However, to manufacture LCDs 100 at a reduced cost and with increased productivity, those phase films with uniaxial optical anisotropy are preferably used.

Hereinafter, preferred properties of the liquid crystal layer 12, first optical compensator 1 and second optical compensator 2 will be described in further detail. It should be noted that the front retardation $\Delta n \cdot d$ of the liquid crystal layer 12, the in-plane retardation $Re_1$ of the first optical compensator 1 and the in-plane retardation $Re_2$ of the second optical compensator 2 are preferably defined with respect to a light ray having the particular wavelength (e.g., a light ray having a wavelength of 550 nm in this preferred embodiment) at which the liquid crystal layer 12 satisfies the first minimum condition.

Liquid Crystal Layer

The display performances of the LCDs were evaluated with the front retardation $\Delta n \cdot d$ of the liquid crystal layer 12 (i.e., retardation with respect to a light ray being incident perpendicularly to the liquid crystal layer 12) changed. More specifically, a number of LCDS, of which the liquid crystal layer 12 had a front retardation $\Delta n \cdot d$ of 370 nm to 580 nm, were fabricated and the display performances thereof were evaluated. In this evaluation, a phase film made of polycarbonate and having an in-plane retardation $Re_1$ of 140 nm was used as the first optical compensator 1, and a phase film made of polyvinyl alcohol was used as the second optical compensator 2. The in-plane retardation $Re_2$ of the second optical compensator 2 was appropriately controlled so as to maximize the contrast ratio in accordance with the variation in the front retardation $\Delta n \cdot d$ of the liquid crystal layer 12. The first optical compensator 1 was arranged such that its slow axis was perpendicular to the orientation directions of liquid crystal molecules in the vicinity of the front substrate 11a. On the other hand, the second optical compensator 2 was arranged such that its slow axis defined an angle of 45 degrees counterclockwise with respect to the orientation directions of liquid crystal molecules near the front substrate 11a as viewed from over the liquid crystal cell 10.

Figure 9:
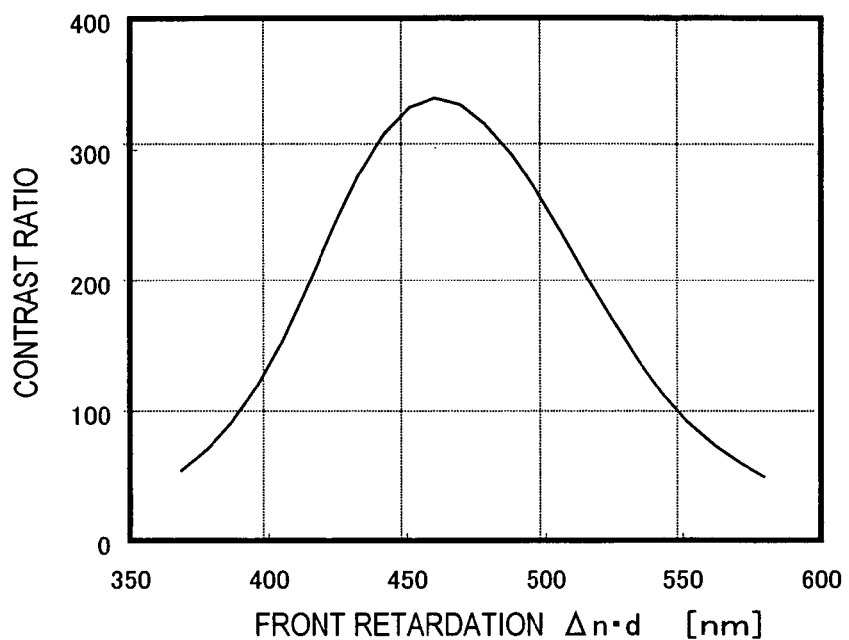
FIG. 9 is a graph showing a relationship between the front retardation $\Delta n \cdot d$ of the liquid crystal layer and the contrast ratio.

FIG. 9 shows a relationship between the front retardation $\Delta n \cdot d$ of the liquid crystal layer 12 and the contrast ratio. As can be seen from FIG. 9, a good display with a contrast ratio of 100 or more is realized by defining the front retardation $\Delta n \cdot d$ of the liquid crystal layer 12 within the range of 390 nm to 550 nm. Also, a better display with a contrast ratio of 200 or more is realized by defining the front retardation $\Delta n \cdot d$ of the liquid crystal layer 12 within the range of 420 nm to 520 nm. And an even better display with a contrast ratio of 300 or more is realized by defining the front retardation $\Delta n \cdot d$ of the liquid crystal layer 12 within the range of 440 nm to 480 nm.

First Optical Compensator

As just described for the liquid crystal layer 12, a number of LCDs were also fabricated and the display performances thereof were evaluated with the in-plane retardation $Re_1$ of the first optical compensator 1 changed. In this case, the liquid crystal layer 12 had a front retardation $\Delta n \cdot d$ of 480 nm and the second optical compensator 2 had an in-plane retardation $Re_2$ of 275 nm.

Figure 10:
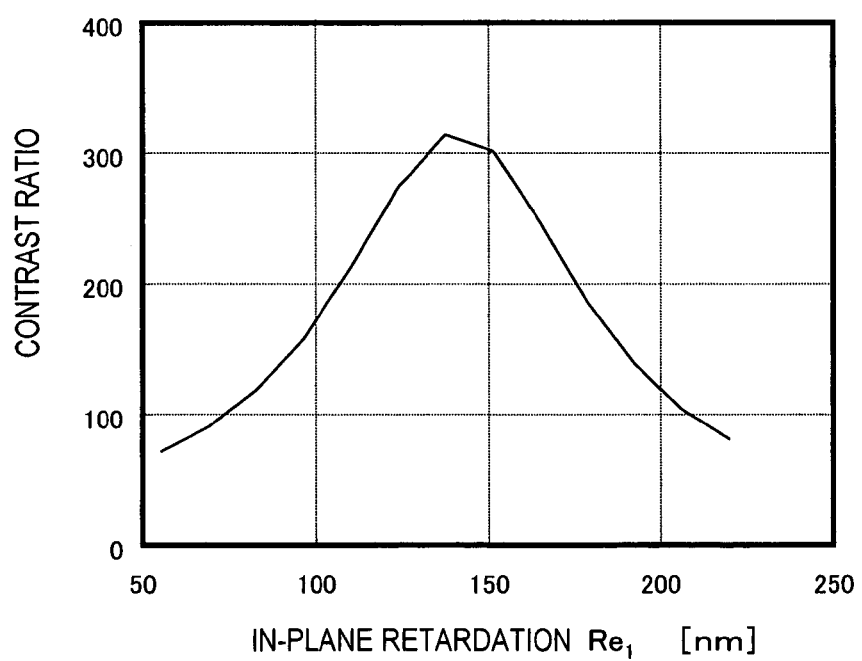
FIG. 10 is a graph showing a relationship between the in-plane retardation $Re_1$ of the first optical compensator and the contrast ratio.

FIG. 10 shows a relationship between the in-plane retardation $Re_1$ of the first optical compensator 1 and the contrast ratio. As can be seen from FIG. 10, a good display with a contrast ratio of 100 or more is realized by defining the in-plane retardation $Re_1$ of the first optical compensator 1 within the range of 75 nm to 210 nm. Also, a better display with a contrast ratio of 200 or more is realized by defining the in-plane retardation $Re_1$ of the first optical compensator 1 within the range of 105 nm to 175 nm.

The display performance of the LCD 100 was evaluated with the angle $\alpha$, defined by the slow axis of the first optical compensator 1 with respect to the orientation directions of liquid crystal molecules located near the substrate 11a closer to the first optical compensator 1 in the black display state, changed. In this case, the front retardation $\Delta n \cdot d$ of the liquid crystal layer 12 was set to 480 nm, the in-plane retardation $Re_1$ of the first optical compensator 1 was set to 140 nm, and the in-plane retardation $Re_2$ of the second optical compensator 2 was set to 275 nm.

Figure 11:
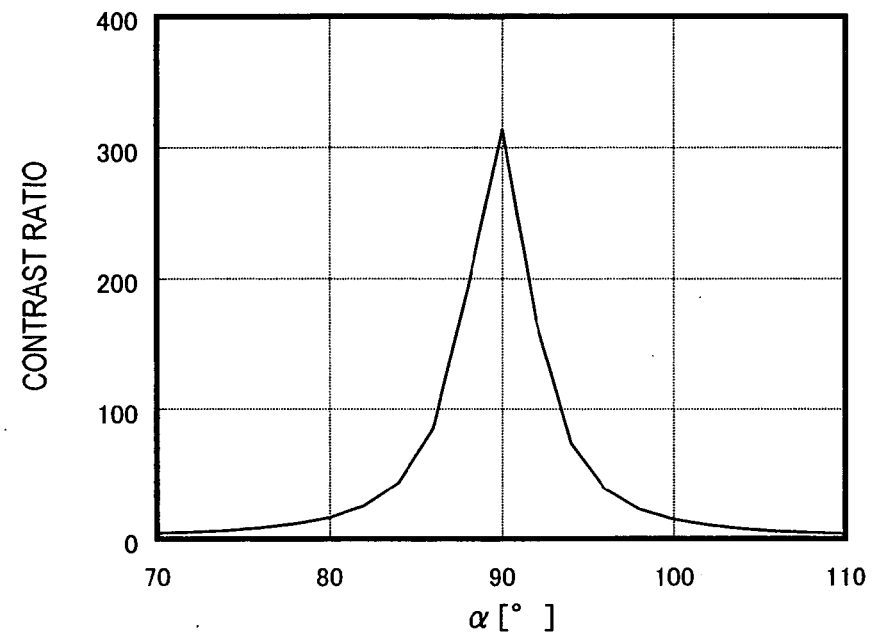
FIG. 11 is a graph showing a relationship between the angle $\alpha$, defined by the slow axis of the first optical compensator with respect to the orientation directions of liquid crystal molecules in the black display state, which are located near one of the two substrates that is closer to the first optical compensator, and the contrast ratio.

FIG. 11 shows a relationship between the angle $\alpha$ and the contrast ratio. As can be seen from FIG. 11, a good display with a contrast ratio of about 100 or more is realized by defining the angle a within the range of 85 degrees to 95 degrees. Also, a better display with a contrast ratio of 200 or more is realized by defining the angle a within the range of 86 degrees to 94 degrees. And an even better display with a contrast ratio of 300 or more is realized by setting the angle α approximately equal to 90 degrees. Thus, this angle α is most preferable to improve the display quality as much as possible.

To sum up, the in-plane retardation $Re_1$ of the first optical compensator 1 is preferably 75 nm to 210 nm and the angle α defined by the slow axis of the first optical compensator 1 with respect to the orientation directions of liquid crystal molecules located near the substrate 11a closer to the first optical compensator 1 in the black display state is preferably 85 degrees to 95 degrees in order to realize a good display state.

Second Optical Compensator

With the front retardation Δn·d of the liquid crystal layer 12 changed within the range of 370 nm to 580 nm, an in-plane retardation $Re_2$ of the second optical compensator 2, which would maximize the contrast ratio, was estimated. In this evaluation, a phase film made of polycarbonate and having an in-plane retardation $Re_1$ of 140 nm was used as the first optical compensator 1, and a phase film made of polyvinyl alcohol was used as the second optical compensator 2.

Figure 12:
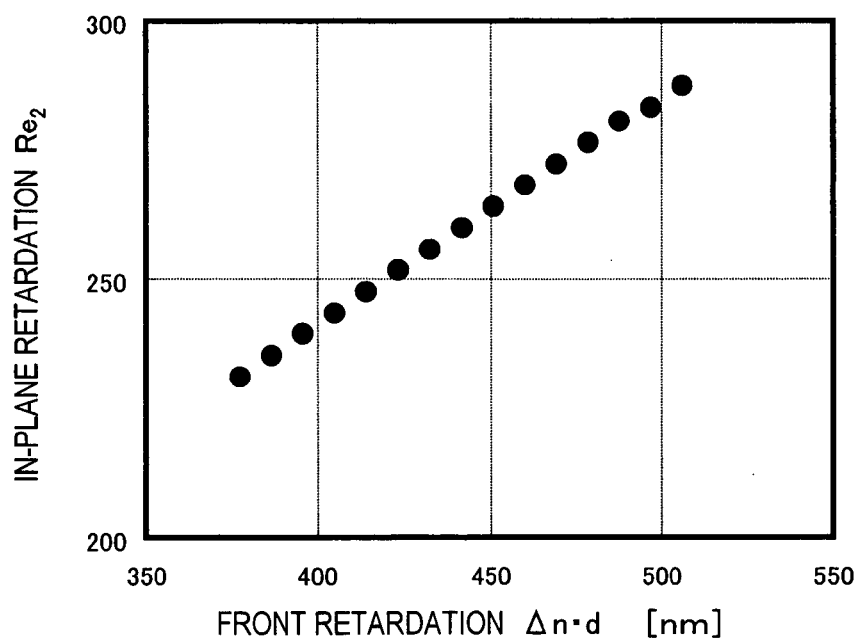
FIG. 12 is a graph showing a relationship between the front retardation $\Delta n \cdot d$ of the liquid crystal layer and the in-plane retardation $Re_2$ of the second optical compensator producing the maximum contrast ratio.

FIG. 12 shows a relationship between the front retardation Δn·d of the liquid crystal layer 12 and the in-plane retardation $Re_2$ of the second optical compensator 2 that would maximize the contrast ratio. As can be seen from FIG. 12, if the liquid crystal layer 12 had a front retardation Δn·d of 370 nm to 580 nm, the contrast ratio was substantially maximized when the in-plane retardation $Re_2$ of the second optical compensator 2 satisfied $Re_2=0.44 \cdot (\Delta n \cdot d)+65$.

The display performance of the LCD 100 was evaluated with the front retardation Δn·d of the liquid crystal layer 12 fixed at 480 nm and with the in-plane retardation $Re_2$ of the second optical compensator 2 changed within the range of 200 nm to 320 nm.

Figure 13:
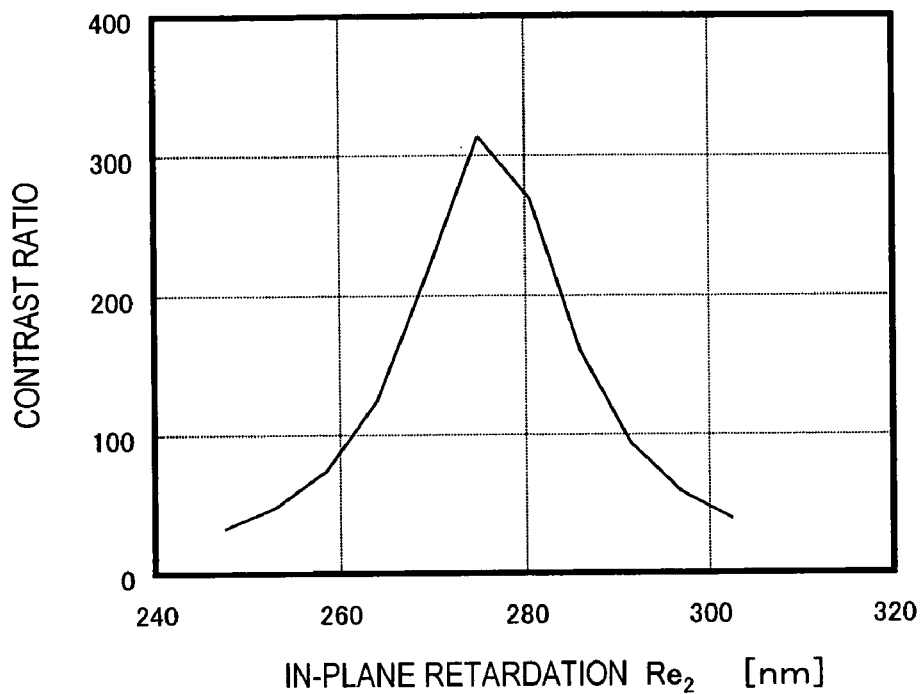
FIG. 13 is a graph showing a relationship between the in-plane retardation $Re_2$ of the second optical compensator and the contrast ratio.

FIG. 13 shows a relationship between the in-plane retardation $Re_2$ of the second optical compensator 2 and the contrast ratio. As can be seen from FIG. 13 and the equation mentioned above, the maximum contrast ratio was achieved when the second optical compensator 2 had an in-plane retardation $Re_2$ of 276.2 nm. As also can be seen from FIG. 13, a good display with contrast ratios of 100 or more was realized as long as the variation from that in-plane retardation $Re_2$, which maximized the contrast ratio, was 15 nm or less. That is to say, a good display is realized if the in-plane retardation $Re_2$ of the second optical compensator 2 satisfies the inequality $0.44 \cdot (\Delta n \cdot d)+50 \leq Re_2 \leq 0.44 \cdot (\Delta n \cdot d)+80$. Furthermore, a better display with contrast ratios of 200 or more was realized as long as the variation from that in-plane retardation $Re_2$, which maximized the contrast ratio, was 10 nm or less. Consequently, a better display is realized if the in-plane retardation $Re_2$ of the second optical compensator 2 satisfies the inequality $0.44 \cdot (\Delta n \cdot d)+55 \leq Re_2 < 0.44 (\Delta n \cdot d)+75$.

The display performance of the LCD 100 was evaluated with the angle β, defined by the slow axis of the second optical compensator 2 with respect to the orientation directions of liquid crystal molecules located near the substrate 11a closer to the first optical compensator 1 in the black display state, changed. In this case, a positive angle β was supposed to be defined clockwise, and a negative angle β was supposed to be defined counterclockwise, when the liquid crystal cell 10 was viewed from the second optical compensator 2.

Figure 14:
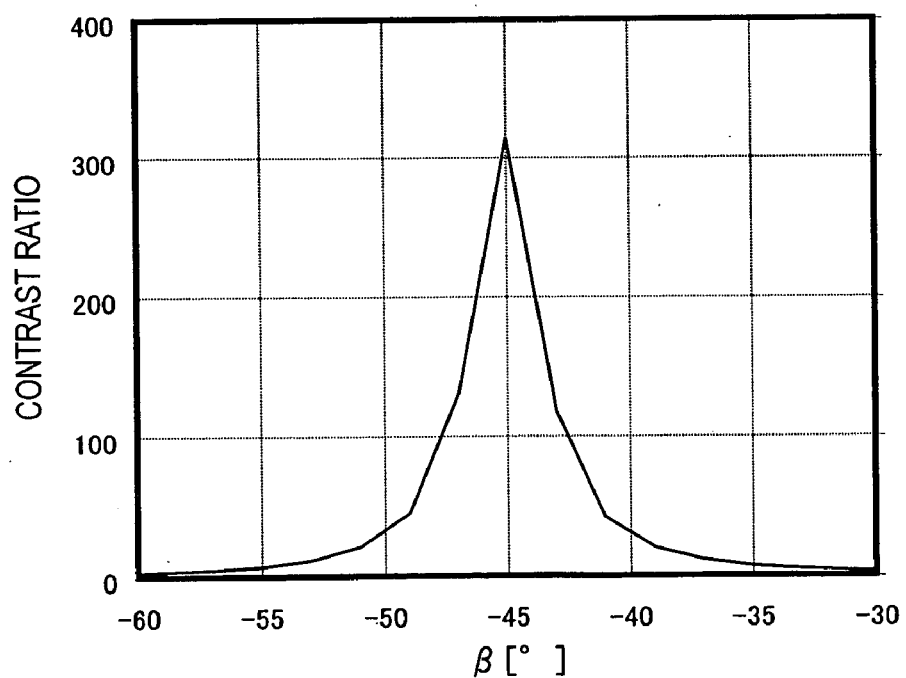
FIG. 14 is a graph showing a relationship between the angle $\beta$, defined by the slow axis of the second optical compensator with respect to the orientation directions of liquid crystal molecules in the black display state, which are located near one of the two substrates that is closer to the first optical compensator, and the contrast ratio.

FIG. 14 shows a relationship between the angle β and the contrast ratio. As can be seen from FIG. 14, a good display with a contrast ratio of about 100 or more is realized by defining the angle β within the range of 42 degrees to 48 degrees counterclockwise. Also, a better display with a contrast ratio of 200 or more is realized by defining the angle β within the range of 43 degrees to 47 degrees counterclockwise. And an even better display with a contrast ratio of 300 or more is realized by setting the angle β approximately equal to 45 degrees counterclockwise. Thus, this angle β is most preferable to improve the display quality as much as possible.

Figure 15:
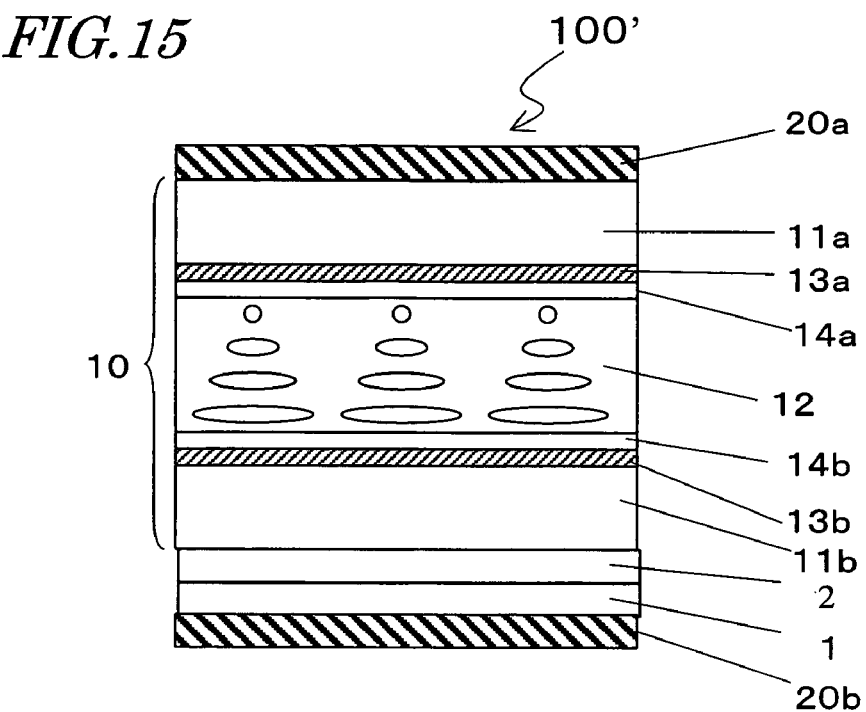
FIG. 15 is a cross-sectional view schematically illustrating an LCD 100' according to another specific preferred embodiment of the present invention.

In the preferred embodiment described above, the first and second optical compensators 1 and 2 are supposed to be located closer to the viewer than the liquid crystal cell 10 is. Alternatively, the first and second optical compensators 1 and 2 may also be located more distant from the viewer than the liquid crystal cell 10 is. The LCD 100' shown in FIG. 15 is obtained by turning the LCD 100 upside down, and is optically equivalent to the LCD 100. Accordingly, in the LCD 100', the wavelength dependences of the angle of rotation and the ellipticity of a polarized light ray passing through a liquid crystal layer in the black display state are similarly compensated for by the first and second optical compensators 1 and 2. As a result, the LCD 100' can also conduct a display operation with coloring of black display minimized and with the contrast ratio increased significantly.

Multilayer Phase Plate

Figure 16A:
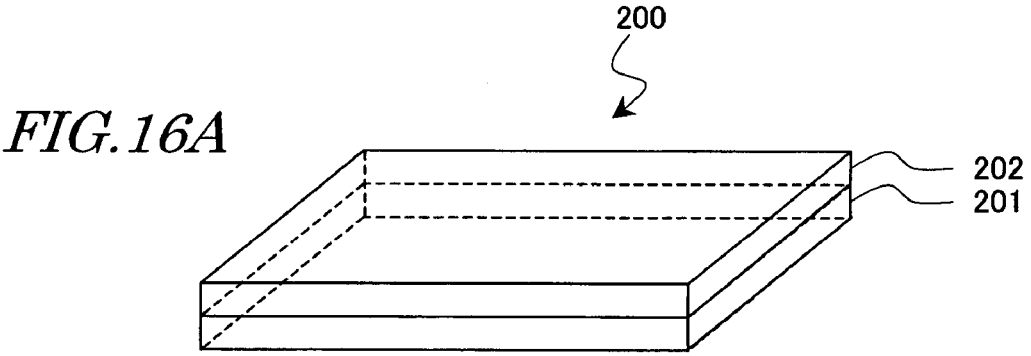
FIG. 16A is a perspective view schematically illustrating a multilayer phase plate 200 according to a specific preferred embodiment of the present invention.
Figure 16B:
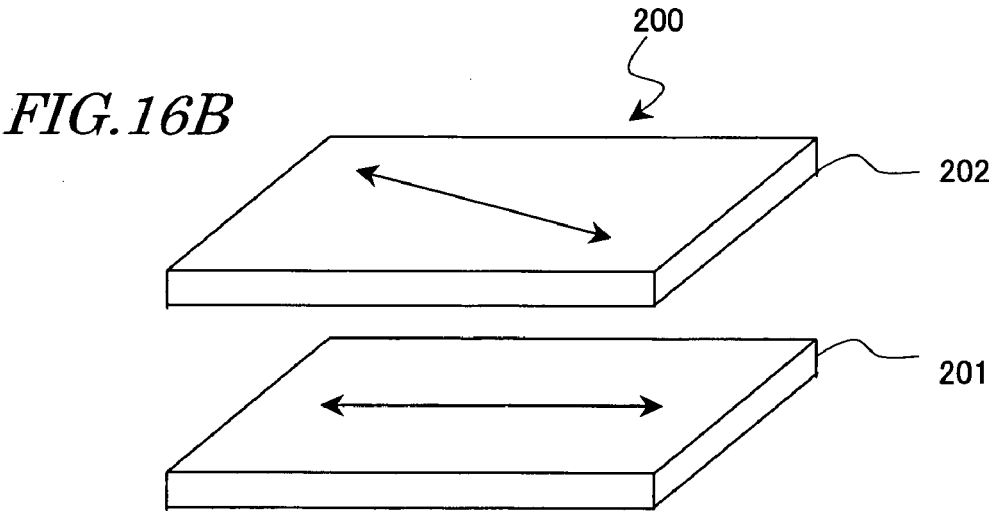
FIG. 16B is an exploded perspective view of the multilayer phase plate 200.

The first and second optical compensators 1 and 2 for use in an LCD according to a preferred embodiment of the present invention may be a multilayer phase plate 200 such as that shown in FIGS. 16A and 16B. FIG. 16B is an exploded perspective view of the multilayer phase plate 200, in which the arrows indicate the slow axes. As shown in FIGS. 16A and 16B, the multilayer phase plate 200 preferably has a multilayer structure including a first layer 201 and a second layer 202.

Each of the first and second layers 201 and 202 preferably has a slow axis, and exhibits a retardation, within a plane that is defined parallel to its principal surfaces. The first layer 201 preferably functions as the first optical compensator and the second layer 202 preferably functions as the second optical compensator.

The multilayer phase plate 200 may be used for a TN LCD for performing a display operation in Normally White mode and can compensate for the wavelength dependences of the angle of rotation and ellipticity of a polarized light ray, passing through a liquid crystal layer in the black display state, over substantially the entire visible radiation range. That is to say, the multilayer phase plate 200 can function as a broadband wavelength compensator. In a typical arrangement, the first layer 201 is preferably located closer to the liquid crystal cell than the second layer 202 is.

To make an effective optical compensation on an LCD with normal specifications, the first layer 201 preferably has an in-plane retardation of 75 nm to 210 nm as can be seen from FIG. 10.

Supposing the liquid crystal layer of the liquid crystal cell has a front retardation Δn·d, the in-plane retardation of the second layer 202 preferably satisfies the inequality $0.44 \cdot (\Delta n \cdot d)+50 \leq Re_2 \leq 0.44 \cdot (\Delta n \cdot d)+80$ as can be seen from FIGS. 12 and 13. Also, as can be seen from FIG. 9, a good contrast ratio is achieved if the liquid crystal layer has a front retardation Δn·d of 390 nm to 550 nm. Accordingly, in a liquid crystal cell including a liquid crystal layer with a front retardation Δn·d falling within this range, the second layer 202 preferably has an in-plane retardation of 220 nm to 320 nm as can be seen from the equation described above. Consequently, to make the optical compensation effectively, the second layer 202 preferably has an in-plane retardation of 220 nm to 320 nm.

Also, as can be seen from FIG. 14, the slow axis of the second layer 202 preferably defines an angle of 42 degrees to 48 degrees, more preferably an angle of 43 degrees to 47 degrees, and most preferably an angle of approximately 45 degrees, with respect to that of the first layer 201.

Various preferred embodiments of the present invention provide a normally black mode twisted nematic liquid crystal display device, which can conduct a black display operation with the unwanted coloring minimized and with the contrast ratio increased significantly and which can be manufactured at a reduced cost, and also provide a multilayer phase plate, which can be used effectively in such a liquid crystal display device.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A twisted nematic liquid crystal display device for conducting a display operation in Normally Black mode, the liquid crystal display device comprising
    a liquid crystal cell including two substrates and a liquid crystal layer sandwiched between the two substrates, and
    two polarizers facing each other with the liquid crystal cell interposed between themselves,
    wherein the liquid crystal display device further includes a first optical compensator, which is provided between one of the two polarizers and the liquid crystal cell so as to compensate for the wavelength dependence of the angle of rotation of polarized light passing through the liquid crystal layer in a black display state, and
    a second optical compensator, which is provided between the first optical compensator and that polarizer so as to compensate for the wavelength dependence of the ellipticity of the polarized light passing through the liquid crystal layer in the black display state,
    wherein the second optical compensator exhibits a retardation, and has a slow axis, within a plane that is defined parallel to the liquid crystal layer, and
    wherein the in-plane retardation $Re_2$ of the second optical compensator and the front retardation $\Delta n \cdot d$ of the liquid crystal layer satisfy the inequality $0.44 \cdot (\Delta n \cdot d) + 50 \leq Re_2 \leq 0.44 \cdot (\Delta n \cdot d) + 80$, and
    wherein the slow axis of the second optical compensator defines an angle of 42 degrees to 48 degrees with respect to orientation directions of liquid crystal molecules in the black display state, the liquid crystal molecules being included in the liquid crystal layer and located near one of the two substrates, which is closer to the first optical compensator.

2. The liquid crystal display device of claim 1, wherein if the polarized light passes through the liquid crystal layer in the black display state, the first optical compensator has functions of hardly changing the polarization direction of a linearly polarized light ray having a particular wavelength but substantially aligning the elliptical major-axis direction of an elliptically polarized light ray, having a wavelength that is shorter or longer than the particular wavelength, with the polarization direction of the linearly polarized light ray.

3. The liquid crystal display device of claim 2, wherein if the polarized light passes through the liquid crystal layer in the black display state, the second optical compensator has functions of passing the linearly polarized light ray having the particular wavelength as it is but changing the elliptically polarized light ray, having the wavelength that is shorter or longer than the particular wavelength, into a substantially linearly polarized light ray.

4. The liquid crystal display device of claim 2, wherein the first optical compensator exhibits a retardation, and has a slow axis, within a plane that is defined parallel to the liquid crystal layer, and
    wherein the slow axis and the wavelength dispersion characteristic of in-plane retardations of the first optical compensator are adjusted into predetermined ones according to the wavelength dependence of the angle of rotation of the polarized light passing through the liquid crystal layer in the black display state, thereby allowing the first optical compensator to perform the functions.

5. The liquid crystal display device of claim 3, wherein the second optical compensator exhibits a retardation, and has a slow axis, within a plane that is defined parallel to the liquid crystal layer, and
    wherein the slow axis and the wavelength dispersion characteristic of in-plane retardations of the second optical compensator are adjusted into predetermined ones according to the wavelength dependence of the ellipticity of the polarized light passing through the liquid crystal layer in the black display state, thereby allowing the second optical compensator to perform the functions.

6. The liquid crystal display device of claim 2, wherein the particular wavelength falls within the range of 450 nm to 600 nm.

7. The liquid crystal display device of claim 1, wherein the liquid crystal layer has a front retardation $\Delta n \cdot d$ of 390 nm to 550 nm in the black display state.

8. The liquid crystal display device of claim 1, wherein the first optical compensator exhibits a retardation, and has a slow axis, within a plane that is defined parallel to the liquid crystal layer, and
    wherein the first optical compensator has an in-plane retardation $Re_1$ of 75 nm to 210 nm, and
    wherein the slow axis of the first optical compensator defines an angle of 85 degrees to 95 degrees with respect to orientation directions of liquid crystal molecules in the black display state, the liquid crystal molecules being included in the liquid crystal layer and located near one of the two substrates, which is closer to the first optical compensator.

9. The liquid crystal display device of claim 1, wherein the first and second optical compensators are located closer to a viewer than the liquid crystal cell is.

10. The liquid crystal display device of claim 1, wherein the first and second optical compensators are located more distant from a viewer than the liquid crystal cell is.

11. The liquid crystal display device of claim 1, wherein the first optical compensator is a phase film with uniaxial optical anisotropy.

12. The liquid crystal display device of claim 1, wherein the second optical compensator is a phase film with uniaxial optical anisotropy.

13. The liquid crystal display device of claim 1, wherein the transmission axis of the other polarizer is either substantially parallel or substantially perpendicular to the orientation directions of the liquid crystal molecules in the black display state, the liquid crystal molecules being included in the liquid crystal layer and located near the substrate that is closer to the first optical compensator.

14. The liquid crystal display device of claim 1, wherein the liquid crystal layer has a twist angle of 85 degrees to 95 degrees.

* * * * *